US008285062B2

(12) United States Patent
Liu et al.

(10) Patent No.: US 8,285,062 B2
(45) Date of Patent: Oct. 9, 2012

(54) METHOD FOR IMPROVING THE PERFORMANCE OF EMBEDDED GRAPHICS CODING

(75) Inventors: Wei Liu, San Jose, CA (US);
Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 12/837,364

(22) Filed: Jul. 15, 2010

(65) Prior Publication Data
US 2011/0033126 A1    Feb. 10, 2011

Related U.S. Application Data

(60) Provisional application No. 61/273,611, filed on Aug. 5, 2009.

(51) Int. Cl.
*G06K 9/36*  (2006.01)
*G06K 9/46*  (2006.01)

(52) U.S. Cl. ........................................... 382/239

(58) Field of Classification Search ................ None
See application file for complete search history.

(56) References Cited

U.S. PATENT DOCUMENTS

| 4,546,385 | A | * | 10/1985 | Anastassiou | 348/390.1 |
|---|---|---|---|---|---|
| 5,850,261 | A | * | 12/1998 | Kondo et al. | 375/240.24 |
| 5,903,676 | A | * | 5/1999 | Wu et al. | 382/244 |
| 6,091,777 | A | | 7/2000 | Guetz et al. | |
| 6,272,180 | B1 | * | 8/2001 | Lei | 375/240.16 |
| 6,567,081 | B1 | | 5/2003 | Li et al. | |
| 6,614,939 | B1 | * | 9/2003 | Yamauchi | 382/240 |
| 6,909,811 | B1 | * | 6/2005 | Kajiwara et al. | 382/246 |
| 6,983,075 | B2 | * | 1/2006 | Schwartz et al. | 382/251 |
| 7,085,424 | B2 | | 8/2006 | Kajiki et al. | |
| 7,194,140 | B2 | | 3/2007 | Ito et al. | |

(Continued)

FOREIGN PATENT DOCUMENTS

EP    2081155 A1    7/2009

(Continued)

OTHER PUBLICATIONS

Golchin, F. et al. ,"A lossless image coder with context classification, adaptiveprediction and adaptive entropy coding", Acoustics, Speech and Signal Processing, 1998. Proceedings of the 1998 IEEE International Conference, May 12-15, 1998, vol. 5,pp. 2545-2548.

(Continued)

*Primary Examiner* — Samir Ahmed
(74) *Attorney, Agent, or Firm* — Haverstock & Owens LLP

(57) ABSTRACT

Embedded Graphics Coding (EGC) is used to encode images with sparse histograms. In EGC, an image is divided into blocks of pixels. For each block, the pixels are converted into binary representations. For each block, the pixels are scanned and encoded bit-plane by bit-plane from the most significant bit-plane (MSB) to the least significant bit-plane (LSB). The pixels in the block are partitioned into groups. Each group contains pixels with the same value. From the MSB to the LSB, the groups in the current bit plane are processed. During the processing, a group is split into two, if pixels in the group have different bit values in the bit-plane being encoded. Then, the encoder sends the refinement bit for each pixel in the group and the encoder splits the original group into two. A method is described herein to compress the refinement bits which employs context-adaptive prediction and binary run-length coding.

20 Claims, 6 Drawing Sheets

U.S. PATENT DOCUMENTS

| | | | |
|---|---|---|---|
| 7,321,697 B2* | 1/2008 | Sudharsanan et al. | 382/244 |
| 7,356,191 B2* | 4/2008 | Hosaka et al. | 382/248 |
| 7,505,624 B2 | 3/2009 | Ogden et al. | |
| 7,567,719 B2 | 7/2009 | Kalevo et al. | |
| 7,742,645 B2* | 6/2010 | Nakamura | 382/232 |
| 8,170,357 B2* | 5/2012 | Kim et al. | 382/243 |
| 8,213,729 B2* | 7/2012 | Kajiwara | 382/233 |
| 2005/0001928 A1* | 1/2005 | Takagi | 348/384.1 |
| 2005/0152605 A1* | 7/2005 | Hoogendijk | 382/232 |
| 2005/0195897 A1 | 9/2005 | Cha | |
| 2007/0217695 A1* | 9/2007 | Nakamura | 382/232 |
| 2008/0043846 A1* | 2/2008 | Yokoyama | 375/240.16 |
| 2008/0101464 A1* | 5/2008 | Lei | 375/240.03 |
| 2008/0297620 A1 | 12/2008 | Goel | |
| 2009/0202164 A1* | 8/2009 | Rossato et al. | 382/238 |
| 2011/0033127 A1* | 2/2011 | Rasmusson et al. | 382/238 |

FOREIGN PATENT DOCUMENTS

WO      0049571 A2      8/2000

OTHER PUBLICATIONS

Wu, X. et al., "Context-based, adaptive, lossless image coding", Communications, IEEE Transactions, Apr. 1, 1997, vol. 45, Issue 4, pp. 437-444.

Tan and Zakhor, "Real-Time Internet Video Using Error Resilient Scalable Compression and TCP-Friendly Transport Protocol." IEEE Transactions on Multimedia, vol. 1, No. 2, Jun. 1999.

Van der Schaar and Radha, "Unequal Packet Loss Resilience for Fine-Granular-Scalability Video," IEEE Transactions on Multimedia, vol. 3, No. 4, Dec. 2001.

* cited by examiner

| Current bit<br>Prev. bit | $b_i = 0$ | $b_i = 1$ | |
|---|---|---|---|
| $b_{i-1} = 0$ | 5 | ⑩ | ← Largest for $b_{i-1}=0$ |
| $b_{i-1} = 1$ | 2 | ③ | ← Largest for $b_{i-1}=1$ |

Context Model used for Prediction

Fig. 2

Prediction

|  | $b_i = 0$ | $b_i = 1$ |
|---|---|---|
| $b_{i-1} = 0$ | 5 | 10 |
| $b_{i-1} = 1$ | 2 | 3 |

Context Model before Prediction

Context Model ↓

$b_{i-1} = 0$ → [ Predictor ] → $Pred(b_i) = 1$

| $b_{i-1} = 0$ | $b_i = 0$ |
|---|---|

Actual Value ↓

Context Update

|  | $b_i = 0$ | $b_i = 1$ |
|---|---|---|
| $b_{i-1} = 0$ | 6 | 10 |
| $b_{i-1} = 1$ | 2 | 3 |

Context Model is updated after Prediction

Fig. 3

METHOD FOR IMPROVING THE PERFORMANCE OF EMBEDDED GRAPHICS CODING

CROSS-REFERENCE TO RELATED APPLICATION(S)

This application claims the benefit of U.S. Provisional Patent Application Ser. No. 61/273,611, filed Aug. 5, 2009 and entitled "A Method for Improving the Performance of Embedded Graphics Coding," which is hereby incorporated by reference in its entirety for all purposes.

FIELD OF THE INVENTION

The present invention relates to the field of image processing. More specifically, the present invention relates to embedded graphics coding.

BACKGROUND OF THE INVENTION

Most image compression schemes are designed for "natural images" such as photos taken by a digital camera. For natural images, strong correlation exists among neighboring pixels. Hence, most image compression schemes work as follows:

1. The pixels are decorrelated using prediction or transform or both, resulting in a sparse histogram of the prediction residuals or transform coefficients. The histogram has a single peak which is located around 0.
2. Quantization is applied as necessary.
3. The (quantized) prediction residuals or transform coefficients are entropy coded. The entropy coder is designed for distributions described above. If the distribution has a significantly different shape, the coding performance is able to be poor.

However, there are many "unnatural images" such as images of graphics or text which typically have a large dynamic range, strong contrast, sharp edges, strong textures and sparse histograms. These types of images are usually not handled well by conventional image compression algorithms. Inter-pixel correlation is weaker, and prediction or transform does not provide a sparse distribution as it does for natural images.

Some schemes have been proposed for unnatural images. One example is referred to as "histogram packing" where the encoder goes through the whole image, computes the histogram and does a non-linear mapping of the pixels before compressing the image. The compression requires a two-pass processing, causing increased memory cost and more computations. The bitstream is not scalable which means that the decoder needs the whole bitstream to decode the image. Partial reconstruction is not possible without re-encoding.

SUMMARY OF THE INVENTION

Embedded Graphics Coding (EGC) is used to encode images that have sparse histograms. In EGC, an image is divided into blocks of pixels. For each block, the pixels are converted into binary representations. For each block, the pixels are scanned and encoded bit-plane by bit-plane from the most significant bit-plane (MSB) to the least significant bit-plane (LSB). The pixels in the block are partitioned into groups. Each group contains pixels that have the same value. From the MSB to the LSB, the groups in the current bit plane are processed. During the processing, a group is split into two, if pixels in the group have different bit values in the bit-plane being encoded. Then, the encoder sends the refinement bit for each pixel in the group and the encoder splits the original group into two. A method is described herein to compress the refinement bits which employs context-adaptive prediction and binary run-length coding.

In one aspect, a method of encoding programmed in a controller in a device comprises performing embedded graphics coding, applying context-adaptive prediction and applying binary run-length coding. Performing embedded graphics coding further comprises partitioning an image into blocks, converting pixels of the blocks into binary representations, partitioning the pixels into groups and processing the groups in a current bit-plane. Applying context-adaptive prediction further comprises performing prediction on refinement bits and generating prediction residuals. Applying binary run-length coding further comprises applying a (fixed or adaptive) codebook to the prediction residuals.

In another aspect, a method of encoding programmed in a controller in a device comprises partitioning an image into blocks, converting pixels of the blocks into binary representations, partitioning the pixels into groups, processing the groups in a current bit-plane, if members of a group of the groups have a same bit value, then a same indicator is indicated and if the members of the group have a different bit value, then a different indicator is indicated, refinement bits are generated, the group is split, context-adaptive prediction is applied to the refinement bits to generate prediction residuals and binary run-length coding is applied to the prediction residuals. The method further comprises setting a bit budget for the blocks. The bit budget is able to be dynamically changed. The context-adaptive prediction is selected from the group consisting of one-dimensional prediction and two-dimensional prediction. The bits are vectorized in a one-dimensional array in the one-dimensional prediction. The bits are vectorized by scanning the current bit-plane in a raster scan order while skipping pixels in a different group. The prediction residual is an exclusive- or between an original bit and a predicted bit. A context model is utilized in the one-dimensional prediction and the two-dimensional prediction. Two adjacent pixels are used for the two-dimensional prediction. Two-dimensional prediction comprises initializing a context model, coding the refinement bits in a raster-scan order, predicting using the context model, updating the context model and calculating a prediction residual. The prediction residual is entropy coded using binary run-length coding. The binary run-length coding includes variable length coding. Variable length coding utilizes a codebook. The codebook is selected from the group consisting of a fixed codebook or an adaptively selected codebook. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a system for encoding programmed in a controller in a device comprises an embedded graphics coding module for processing an image and generating refinement bits, context-adaptive prediction module for applying context-adaptive prediction to the refinement bits and generating prediction residuals and a binary run-length coding module for applying binary run-length coding to the prediction residuals. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In yet another aspect, a camera device comprises a video acquisition component for acquiring a video, a memory for storing an application, the application for performing embedded graphics coding, applying context-adaptive prediction and applying binary run-length coding and a processing component coupled to the memory, the processing component configured for processing the application.

BRIEF DESCRIPTION OF THE DRAWINGS

FIG. 2 illustrates a table of the number of occurrences of a binary pair according to some embodiments.

FIG. 3 illustrates an example of 1D context-adaptive prediction according to some embodiments.

DETAILED DESCRIPTION OF THE PREFERRED EMBODIMENT

Figure 1:
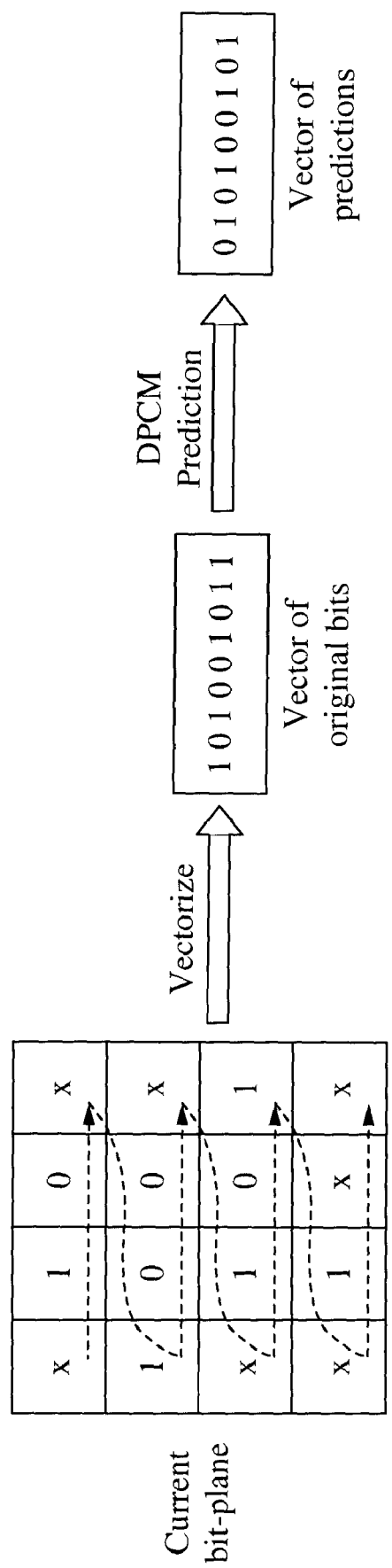
FIG. 1 illustrates an example of vectorizing bits according to some embodiments.

Embedded Graphics Coding (EGC) is able to be used to encode images that have sparse histograms. Thus, it is typically used for, but not limited to, graphical or textual images. EGC provides a lossy to lossless scalability which means the bitstream is able to be stopped in the middle of the bitstream, and the decoder is able to still make a reasonable decoded block based on the bits it has received. If the entire bitstream is sent, the image is able to be losslessly reconstructed. EGC has low complexity and a high coding performance.

In EGC, an image (such as each frame of a video) is divided into blocks. A bit budget is set for each block. The bit budget is agreed upon by the encoder and decoder. In some embodiments, the bit budget is able to be dynamically changed if the bandwidth is time-varying. The coded bitstream is fully embedded, so that the bit budget is able to be changed arbitrarily. For each block, the pixels are converted into binary representations. Predictions and transforms are not performed because the pixels are assumed to have a sparse histogram. For each block, the pixels are scanned and encoded bit-plane by bit-plane from the most significant bit-plane (MSB) to the least significant bit-plane (LSB). The encoding process of each bit-plane is described herein. The encoding is able to be stopped if the bit budget of the current block is depleted or if the reconstructed block has reached the end of the LSB. If the reconstructed block has reached the end of the LSB, the decoder also knows where the end of the block is. For each block, if all of the bit-planes are coded, the compression is lossless.

The pixels in the block are partitioned into groups. Each group contains pixels that have the same value. A group is able to be split into two, if pixels in the group have different bit values in the bit-plane being encoded. For sparse histogram images, group splitting rarely occurs.

A method of encoding a bit-plane is used in EGC. Before coding the MSB, the pixels are assumed to be in the same group. Then, from the MSB to the LSB, the groups in the current bit plane are processed, where for each group: the encoder sends a "0" if all group members have the same bit value in the current bit-plane (and then sends a "0" or a "1" to indicate the value) or the encoder sends a "1". Following the "1", the encoder sends the refinement bit for each pixel in the group and the encoder splits the original group into two. The decoder is able to split the group based on the refinement bits.

As described in the approach above, when a group is split, raw bits are sent for all members of the group in the current bit-plane without any compression. A method is described herein to compress these bits which employs context-adaptive prediction and binary run-length coding.

Context-Adaptive Prediction

Prediction is usually used in compression to reduce the information entropy of the signal to be coded. The signal to be coded is binary. Before prediction, the raw bits are expected to have equal probability of 0 and 1, hence the information entropy is 1 bit per sample. However, after prediction, a prediction residual is obtained and the probability of the prediction residual being 0 is more than the probability of the prediction residual being 1, hence the information entropy is expected to be less than 1 bit per sample.

There are two methods of context-adaptive prediction described herein: 1D prediction and 2D prediction. The former has lower complexity, and the latter has higher performance. In both cases, contexts are used to improve the prediction performance. A context model is usually initialized first.

One-Dimensional (1D) Prediction

In the 1D prediction case, the bits to be coded (bits in the current group) are vectorized into a 1D array. FIG. 1 illustrates an example of vectorizing the bits according to some embodiments. An 'x' represents a bit in another group. Vectorization is performed by scanning the bit-plane in a raster scan order, and skipping the x's. A simple example of 1D prediction is Differential Pulse-Code Modulation (DPCM). In the example, the predicted bits are the delay-by-1 version of the original. The first bit is not predicted (or 0 is used as the prediction). Other prediction implementations are possible as well. A prediction residual is generated which is the exclusive- or (XOR) between each original bit and its prediction.

1D Context-Adaptive Prediction

The bits to be coded are vectorized as $[b_1, b_2, \ldots, b_n]$. The number of occurrences of a binary pair $(b_{i-1}, b_i)$ are recorded by maintaining a table as shown in FIG. 2. Other recording implementations are possible as well. Initially, all entries in the table are set to 1. During prediction, for example, if $b_{i-1}=0$, the predictor compares the number of occurrences between (0,0) and (0,1), and the more frequent one is used as prediction. Given the context that the previous bit is 0, the method yields the pair that has been more likely to happen in the past. In some embodiments, ties are broken arbitrarily. After prediction, the context model is updated by incrementing the table entry corresponding to the number of occurrences of $(b_{i-1}, b_i)$ by 1. Context-adaptive prediction is more complex than DPCM, but it is usually more efficient in the sense that the prediction residual contains more zeros.

FIG. 3 illustrates an example of 1D context-adaptive prediction according to some embodiments. A context model is shown before prediction. Then, the context model is updated after prediction occurs.

Two Dimensional (2D) Context-Adaptive Prediction

The 1D prediction is able to be extended to the 2D case. In some embodiments, the left and upper neighbors are used for prediction. Binary contexts are still used, with the entry being ($b_{up}$, $b_{left}$). The total number of contexts are reduced. However, if the neighbors are in different groups, their values are not used in the current-bitplane (as is) for context. Context modeling is performed such that: if the left pixel is in the same group as the current pixel, $b_{left}$ is the bit in the current bit-plane of the left pixel. If the left pixel is in the same group as the current pixel, $b_{left}$ is the logic (left>current), where: 'left' is the value of the left pixel, only taking into account its MSB down to the previous bit-plane; 'current' is the value of the current pixel, only taking into account the MSB down to the previous bit-plane. For $b_{up}$, if the up pixel is in the same group as the current pixel, $b_{up}$ is the bit in the current bit-plane of the up pixel. If the up pixel is not in the same group as the current pixel, $b_{up}$ is the logic (up>current), where: 'up' is the value of the up pixel, only taking into account its MSB down to the previous bit-plane; 'current' is the value of the current pixel, only taking into account the MSB down to the previous bit-plane.

Figure 4:
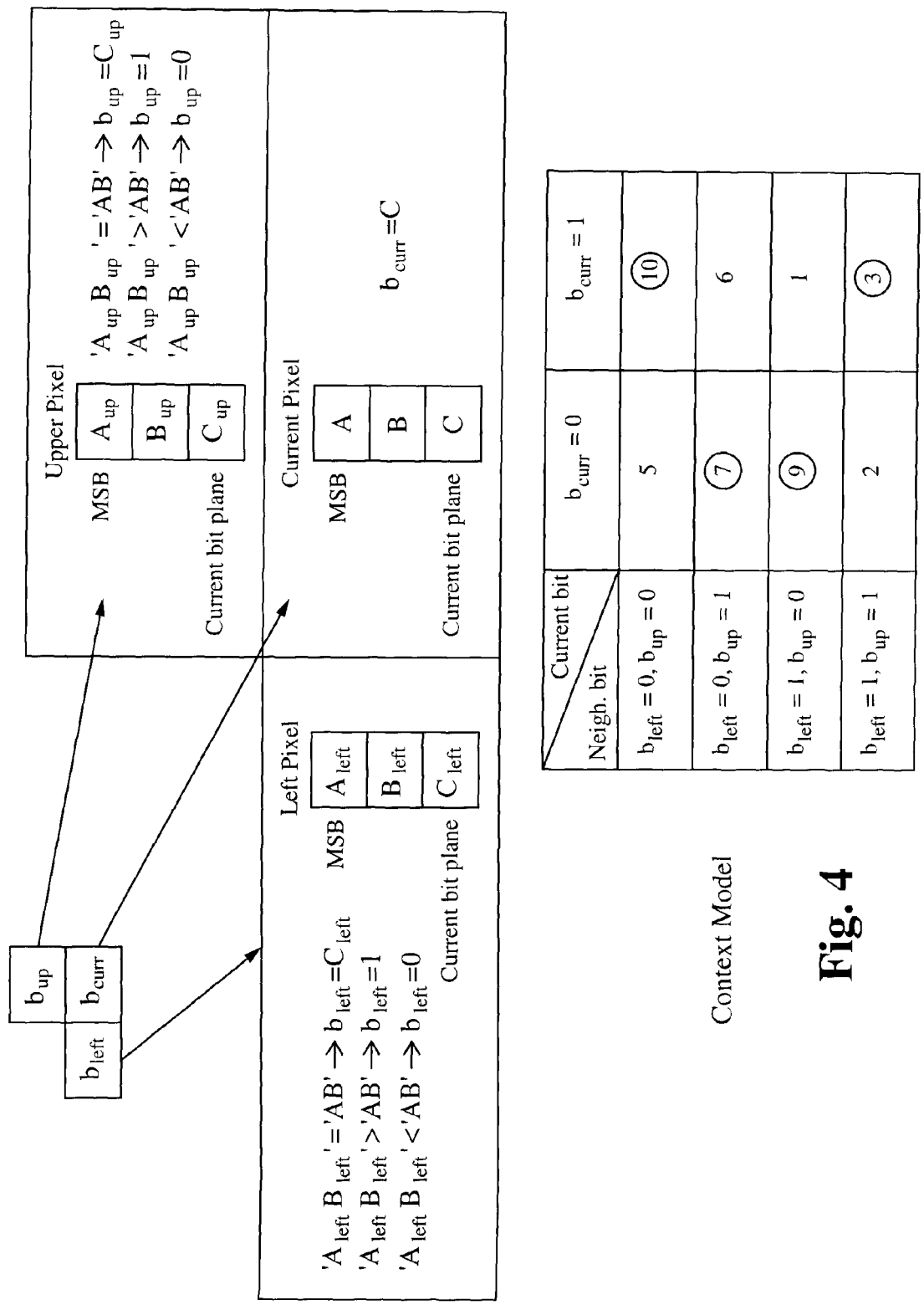
FIG. 4 illustrates an example of 2D context-adaptive prediction according to some embodiments.

FIG. 4 illustrates an example of 2D context-adaptive prediction according to some embodiments. The context model is initialized. The bits are coded in a raster-scan order, and for each bit: the current bit is predicted using the context model, the context model is updated and the prediction residual is calculated using XOR. The prediction residual is entropy coded using binary run-length coding.

Binary Run-Length Coding

Run-length coding is an entry coding method. It is efficient if the signal to be coded has a lot of consecutive 0's. The prediction residual is still binary, so that it is referred to as binary run-length coding (BRLC). Compared to standard run-length coding, BRLC does not code levels (e.g. level is always 1). An example includes, a residual signal: 1,0,0,0,1, 0,1,1,0,0,0,0 and the BRLC from the $2^{nd}$ bit is to encode 3, 1, 0, 4.

Figure 5:
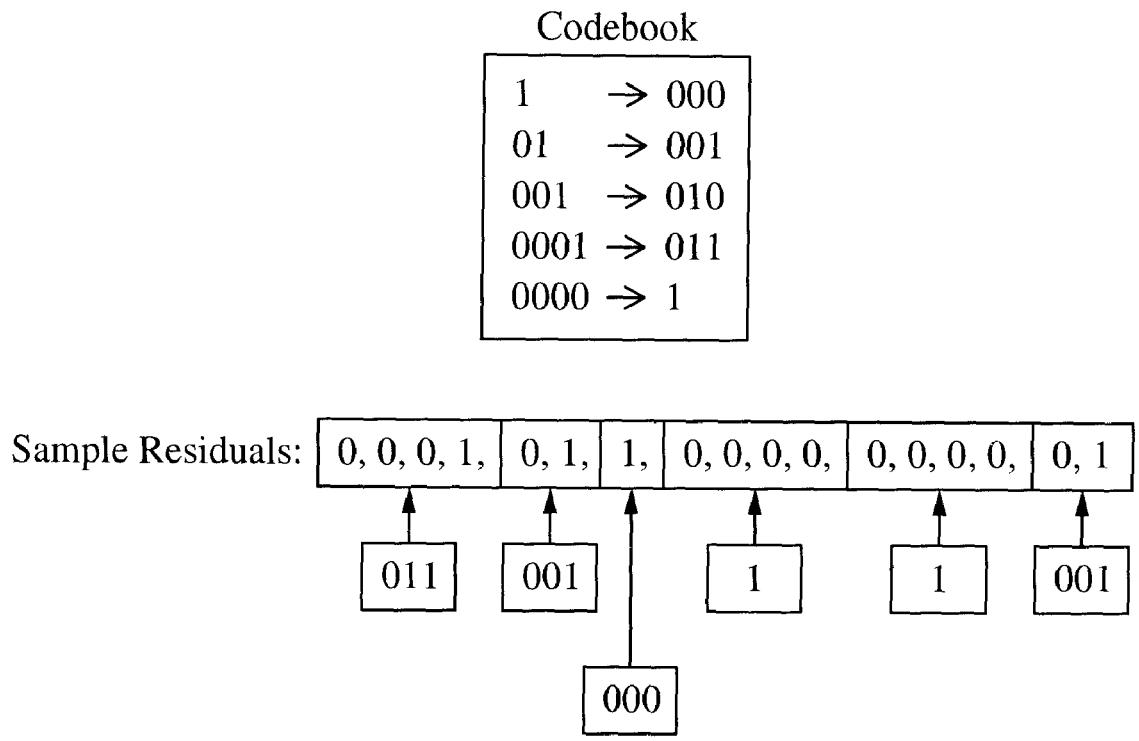
FIG. 5 illustrates an example of run-length coding of sample residuals using a codebook according to some embodiments.

For run-length coding, variable length coding (VLC) is used. The VLC is able to be implemented using a codebook. FIG. 5 illustrates an example of run-length coding of sample residuals using the codebook according to some embodiments. As shown, using the exemplary codebook, a sample residual of 0,0,0,1 is coded as 011; 0,1 is coded as 001; 1 is coded as 000; 0,0,0,0 is coded as 1 and 0,1 is coded as 001.

Figure 6:
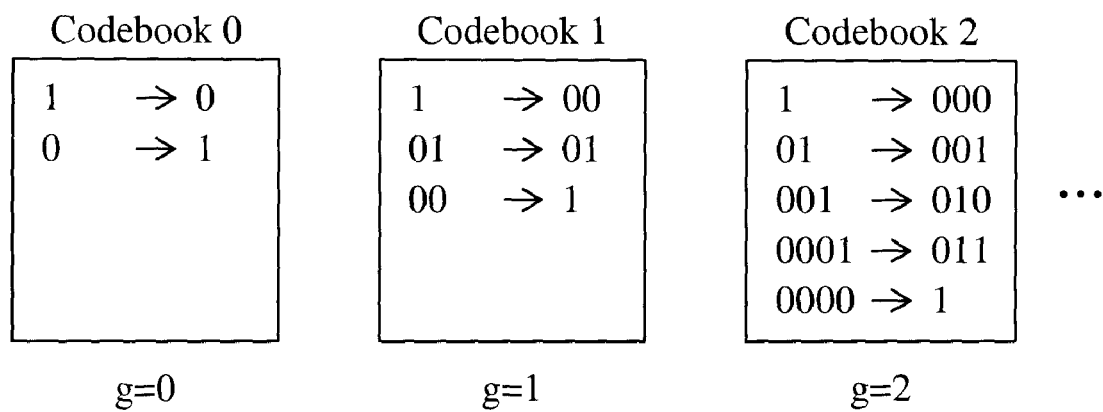
FIG. 6 illustrates an example of adaptively selectable codebooks according to some embodiments.

A fixed codebook is able to be used or a selective method similar to that of JPEG-LS is able to be used. The selective method is able to improve efficiency by allowing a choice of one of several codebooks. In the selective method, the codec adaptively selects, for example, one of the codebooks in FIG. 6, of different lengths, using a selection method. The index g is a variable index that is used to specify the codebook. Larger g values are more efficient for longer runs. More specifically, g is the index of the codebooks, which is able to be 0, 1, 2, . . . , n. If there are $2^g$ consecutive 0's, the output is 1; otherwise, the output is 0, followed by a g-bit binary representation of the number of 0's.

Adaptive Codebook Selection

If a codeword '1' is observed, then there is potentially a long run, therefore, g=g+1 is used for the next run. If other codewords are observed, then g=g−1 is used for the next run.

In some embodiments, selecting the code book makes use of the block size. Both the encoder and the decoder know the size of the group, and g never grows beyond:

ceil(log$_2$(number of not yet coded group members))

where the notation ceil(x) is defined as the smallest integer that is not smaller than x.

Figure 7:
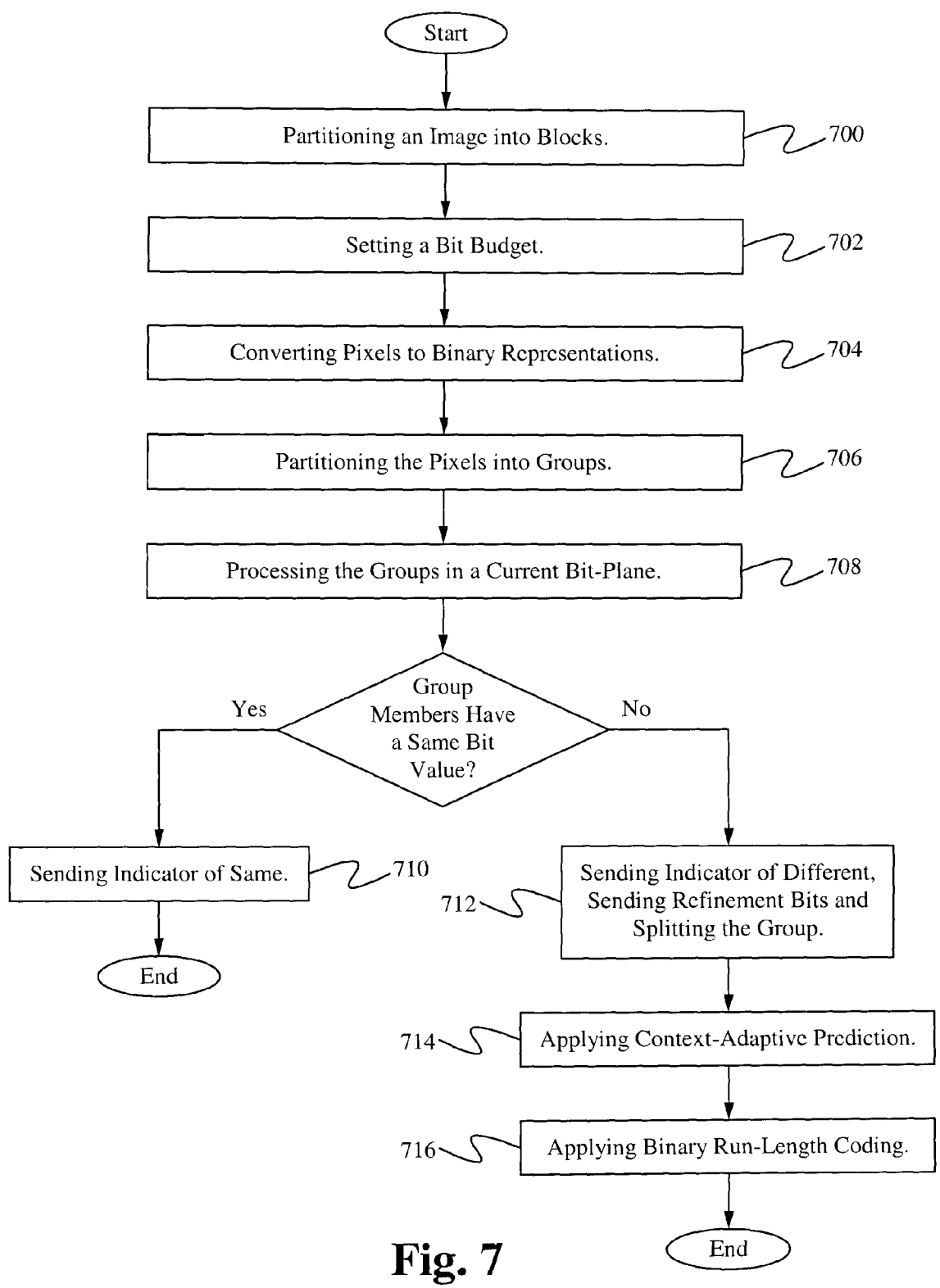
FIG. 7 illustrates a flowchart of a method of implementing an improved embedded graphics coding according to some embodiments.

FIG. 7 illustrates a flowchart of a method of implementing an improved embedded graphics coding according to some embodiments. In the step 700, an image is divided into blocks of pixels. In some embodiments, a bit budget is set for each block, in the step 702. In the step 704, for each block, the pixels are converted into binary representations. In the step 704, for each block, the pixels are scanned and encoded bit-plane by bit-plane from the most significant bit-plane (MSB) to the least significant bit-plane (LSB). In the step 706, the pixels in the block are partitioned into groups. In the step 708, from the MSB to the LSB, the groups in the current bit-plane are processed (encoded). Then, in the step 710, an encoder sends a "0" if all group members have the same bit value in the current bit-plane. Otherwise, in the step 712, the encoder sends a "1" and the refinement bit for each pixel in the group, and the encoder splits the original group into two. After the group is split, context-adaptive prediction is implemented in the step 712, followed by binary run-length coding in the step 714. As described herein, context-adaptive prediction is able to be 1D or 2D. The context-adaptive prediction results in a prediction table which is then used to calculate prediction residuals. The prediction residuals are then encoded using the binary run length encoding. In some embodiments, the binary run length encoding includes utilizing one or more codebooks. Fewer or additional steps are able to be included. Further, the order of the steps is able to be changed where possible.

Figure 8:
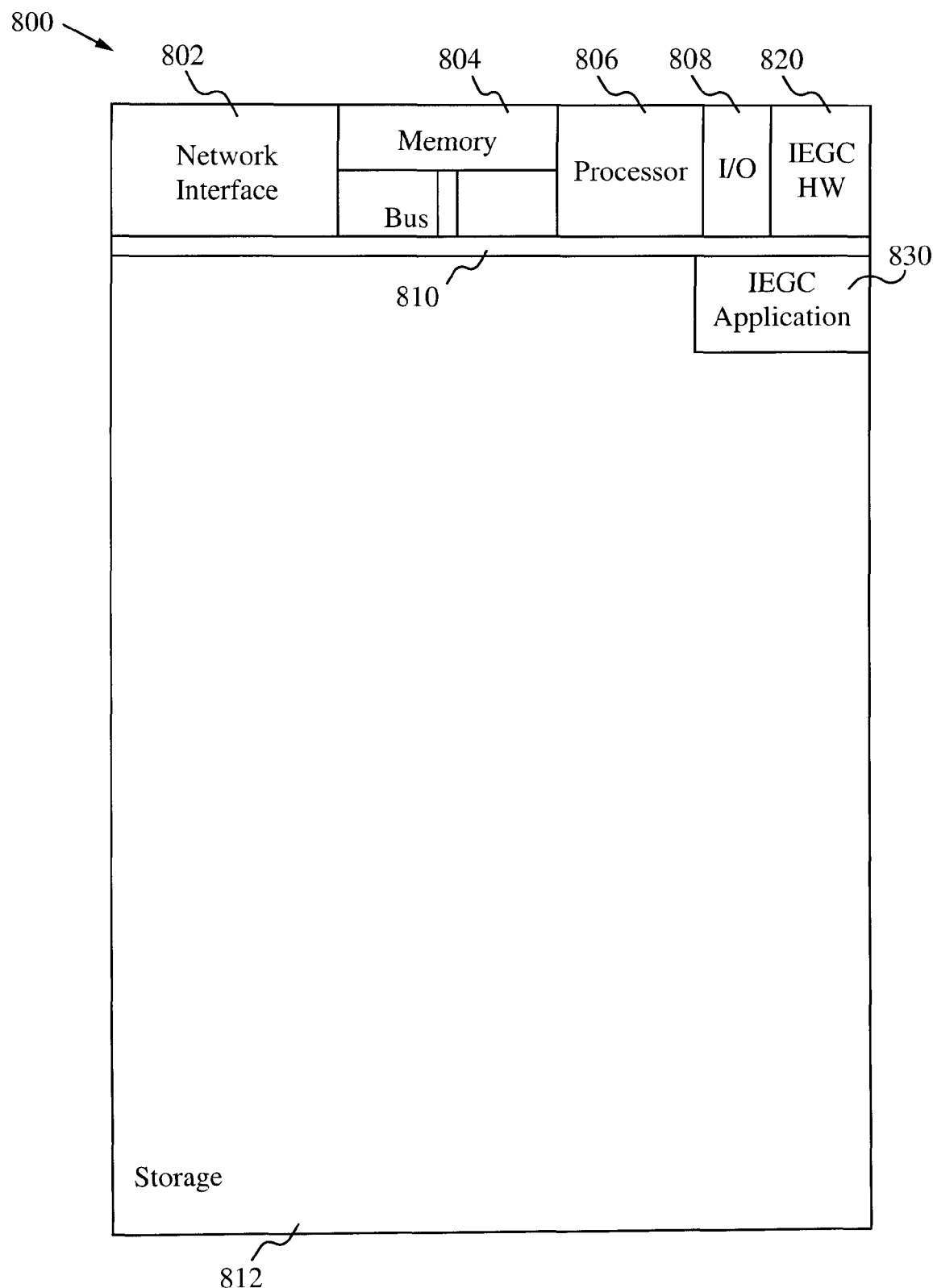
FIG. 8 illustrates a block diagram of an exemplary computing device configured to implement the improved embedded graphics coding method according to some embodiments.

FIG. 8 illustrates a block diagram of an exemplary computing device 800 configured to implement the improved embedded graphics coding (IEGC) method according to some embodiments. The computing device 800 is able to be used to acquire, store, compute, communicate and/or display information such as images and videos. For example, a computing device 800 is able to acquire and store a video. The IEGC method is able to be used during or after acquiring the video, or when transferring the video from the device 800 to another device. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. IEGC application(s) 830 used to perform the IEGC method are likely to be stored in the storage device 812 and memory 804 and processed as applications are typically processed. More or less components shown in FIG. 8 are able to be included in the computing device 800. In some embodiments, IEGC hardware 820 is included. Although the computing device 800 in FIG. 8 includes applications 830 and hardware 820 for improved embedded graphics coding, the IEGC method is able to be implemented on a computing device in hardware, firmware, software or any combination thereof. For example, in some embodiments, the IEGC applications 830 are programmed in a memory and executed using a processor. In another example, in some embodiments, the IEGC hardware 820 is programmed hardware logic including gates specifically designed to implement the compression method.

In some embodiments, the IEGC application(s) 830 include several applications and/or modules. As described herein, modules such as an embedded graphics coding module, a context adaptive prediction module and a binary run-length coding module. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

To utilize the improved embedded graphics coding method, a user acquires a video/image such as on a digital camcorder, and while or after the video is acquired, or when sending the video to another device such as a computer, the improved embedded graphics coding method automatically encodes each image of the video, so that the video is encoded appropriately to maintain a high quality video. The improved embedded graphics coding method occurs automatically without user involvement.

In operation, improved embedded graphics coding is used when a group is to be split at the current bit-plane. Context-adaptive prediction and binary run-length coding are used. The prediction is able to be 1D or 2D. The binary run-length coding is able to use a fixed codebook or an adaptive codebook. Each image block is processed from the MSB to the LSB, hence the resulting bitstream is still embedded. When encoding a group in the current bit-plane, no information is utilized from another group in the same bit-plane, thus different groups in the same bit-plane are able to be encoded in parallel. The improved embedded graphics coding method is able to be used in any implementation including, but not limited to, wireless high definition (Wireless HD).

The improved embedded graphics coding method described herein is able to be used with videos and/or images.

High definition video is able to be in any format including but not limited to HDCAM, HDCAM-SR, DVCPRO HD, D5 HD, XDCAM HD, HDV and AVCHD.

SOME EMBODIMENTS OF IMPROVED EMBEDDED GRAPHICS CODING

1. A method of encoding programmed in a controller in a device comprising:
   a. performing embedded graphics coding;
   b. applying context-adaptive prediction; and
   c. applying binary run-length coding.
2. The method of clause 1 wherein performing embedded graphics coding further comprises:
   a. partitioning an image into blocks;
   b. converting pixels of the blocks into binary representations;
   c. partitioning the pixels into groups; and
   d. processing the groups in a current bit-plane.
3. The method of clause 2 wherein applying context-adaptive prediction further comprises performing prediction on refinement bits and generating prediction residuals.
4. The method of clause 3 wherein applying binary run-length coding further comprises applying one of a fixed or adaptive codebook to the prediction residuals.
5. A method of encoding programmed in a controller in a device comprising:
   a. partitioning an image into blocks;
   b. converting pixels of the blocks into binary representations;
   c. partitioning the pixels into groups;
   d. processing the groups in a current bit-plane;
   e. if members of a group of the groups have a same bit value, then a same indicator is indicated; and
   f. if the members of the group have a different bit value, then:
      i. a different indicator is indicated;
      ii. refinement bits are generated;
      iii. the group is split;
      iv. context-adaptive prediction is applied to the refinement bits to generate prediction residuals; and
      v. binary run-length coding is applied to the prediction residuals.
6. The method of clause 5 further comprising setting a bit budget for the blocks.
7. The method of clause 6 wherein the bit budget is able to be dynamically changed.
8. The method of clause 5 wherein the context-adaptive prediction is selected from the group consisting of one-dimensional prediction and two-dimensional prediction.
9. The method of clause 8 wherein the bits are vectorized in a one-dimensional array in the one-dimensional prediction.
10. The method of clause 9 wherein the bits are vectorized by scanning the current bit-plane in a raster scan order while skipping pixels in a different group.
11. The method of clause 5 wherein the prediction residual is an exclusive- or between an original bit and a predicted bit.
12. The method of clause 8 wherein a context model is utilized in the one-dimensional prediction and the two-dimensional prediction.
13. The method of clause 8 wherein two adjacent pixels are used for the two-dimensional prediction.
14. The method of clause 8 wherein two-dimensional prediction comprises:
    a. initializing a context model;
    b. coding the refinement bits in a raster-scan order;
    c. predicting using the context model;
    d. updating the context model; and
    e. calculating a prediction residual.
15. The method of clause 14 wherein the prediction residual is entropy coded using binary run-length coding.
16. The method of clause 15 wherein the binary run-length coding includes variable length coding.
17. The method of clause 16 wherein variable length coding utilizes a codebook.
18. The method of clause 17 wherein the codebook is selected from the group consisting of a fixed codebook or an adaptively selected codebook.
19. The method of clause 5 wherein the controller is selected from the group consisting of a programmed computer readable medium and an application-specific circuit.
20. The method of clause 5 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

21. A system for encoding programmed in a controller in a device comprising:
   a. an embedded graphics coding module for processing an image and generating refinement bits;
   b. context-adaptive prediction module for applying context-adaptive prediction to the refinement bits and generating prediction residuals; and
   c. a binary run-length coding module for applying binary run-length coding to the prediction residuals.

22. The system of clause 21 wherein the controller is selected from the group consisting of a programmed computer readable medium and an application-specific circuit.

23. The system of clause 21 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

24. A camera device comprising:
   a. a video acquisition component for acquiring a video;
   b. a memory for storing an application, the application for:
      i. performing embedded graphics coding;
      ii. applying context-adaptive prediction; and
      iii. applying binary run-length coding; and
   c. a processing component coupled to the memory, the processing component configured for processing the application.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding programmed in a controller in a device comprising:
   a. performing embedded graphics coding by
      i. partitioning an image into blocks;
      ii. converting pixels of the blocks into binary representations;
      iii. partitioning the pixels into groups; and
      iv. processing the groups in a current bit-plane;
   b. applying context-adaptive prediction comprising performing prediction on refinement bits and generating prediction residuals, if members of a group have a different bit value; and
   c. applying binary run-length coding including applying an adaptive codebook to the prediction residuals.

2. A method of encoding programmed in a controller in a device comprising:
   a. partitioning an image into blocks;
   b. setting a dynamically changeable bit budget for the blocks;
   c. converting pixels of the blocks into binary representations;
   d. partitioning the pixels into groups;
   e. processing the groups in a current bit-plane;
   f. if members of a group of the groups have a same bit value, then a same indicator is indicated; and
   g. if the members of the group have a different bit value, then:
      i. a different indicator is indicated;
      ii. refinement bits are sent;
      iii. the group is split;
      iv. context-adaptive prediction is applied to the refinement bits to generate prediction residuals; and
      v. binary run-length coding is applied to the prediction residuals.

3. The method of claim 2 wherein the bit budget is able to be dynamically changed if bandwidth is time-varying.

4. The method of claim 2 wherein the context-adaptive prediction is selected from the group consisting of one-dimensional prediction and two-dimensional prediction.

5. The method of claim 4 wherein the bits are vectorized in a one-dimensional array in the one-dimensional prediction.

6. The method of claim 5 wherein the bits are vectorized by scanning the current bit-plane in a raster scan order while skipping pixels in a different group.

7. The method of claim 2 wherein the prediction residual is an exclusive-or between an original bit and a predicted bit.

8. The method of claim 4 wherein a context model is utilized in the one-dimensional prediction and the two-dimensional prediction.

9. The method of claim 4 wherein two adjacent pixels are used for the two-dimensional prediction.

10. The method of claim 4 wherein two-dimensional prediction comprises:
    a. initializing a context model;
    b. coding the refinement bits in a raster-scan order;
    c. predicting using the context model;
    d. updating the context model; and
    e. calculating a prediction residual.

11. The method of claim 10 wherein the prediction residual is entropy coded using binary run-length coding.

12. The method of claim 11 wherein the binary run-length coding includes variable length coding.

13. The method of claim 12 wherein variable length coding utilizes a codebook.

14. The method of claim 13 wherein the codebook is selected from the group consisting of a fixed codebook or an adaptively selected codebook.

15. The method of claim 2 wherein the controller is selected from the group consisting of a programmed computer readable medium and an application-specific circuit.

16. The method of claim 2 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, a portable music player, a video player, a DVD writer/player, a television and a home entertainment system.

17. A system for encoding programmed in a controller in a device comprising:
    a. an embedded graphics coding module to process an image and send refinement bits by:
       i. partitioning an image into blocks;
       ii. converting pixels of the blocks into binary representations;
       iii. partitioning the pixels into groups; and
       iv. processing the groups in a current bit-plane;

b. context-adaptive prediction module to apply context-adaptive prediction to the refinement bits and generate prediction residuals, if members of a group have a different bit value; and c. a binary run-length coding module to apply binary run-length coding to the prediction residuals including applying an adaptive codebook to the prediction residuals.

18. The system of claim 17 wherein the controller is selected from the group consisting of a programmed non-transitory computer readable medium and an application-specific circuit.

19. The system of claim 17 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, a portable music player, a video player, a DVD writer/player, a television and a home entertainment system.

20. A camera device comprising:
a. a video acquisition component for acquiring a video;
b. a memory for storing an application, the application for:
   i. performing embedded graphics coding by
      A. partitioning an image into blocks;
      B. converting pixels of the blocks into binary representations;
      C. partitioning the pixels into groups; and
      D. processing the groups in a current bit-plane;
   ii. applying context-adaptive prediction comprising performing prediction on refinement bits and generating prediction residuals, if members of a group have a different bit value; and
   iii. applying binary run-length coding including applying an adaptive codebook to the prediction residuals; and
c. a processing component coupled to the memory, the processing component configured for processing the application.

* * * * *